UNITED STATES PATENT OFFICE.

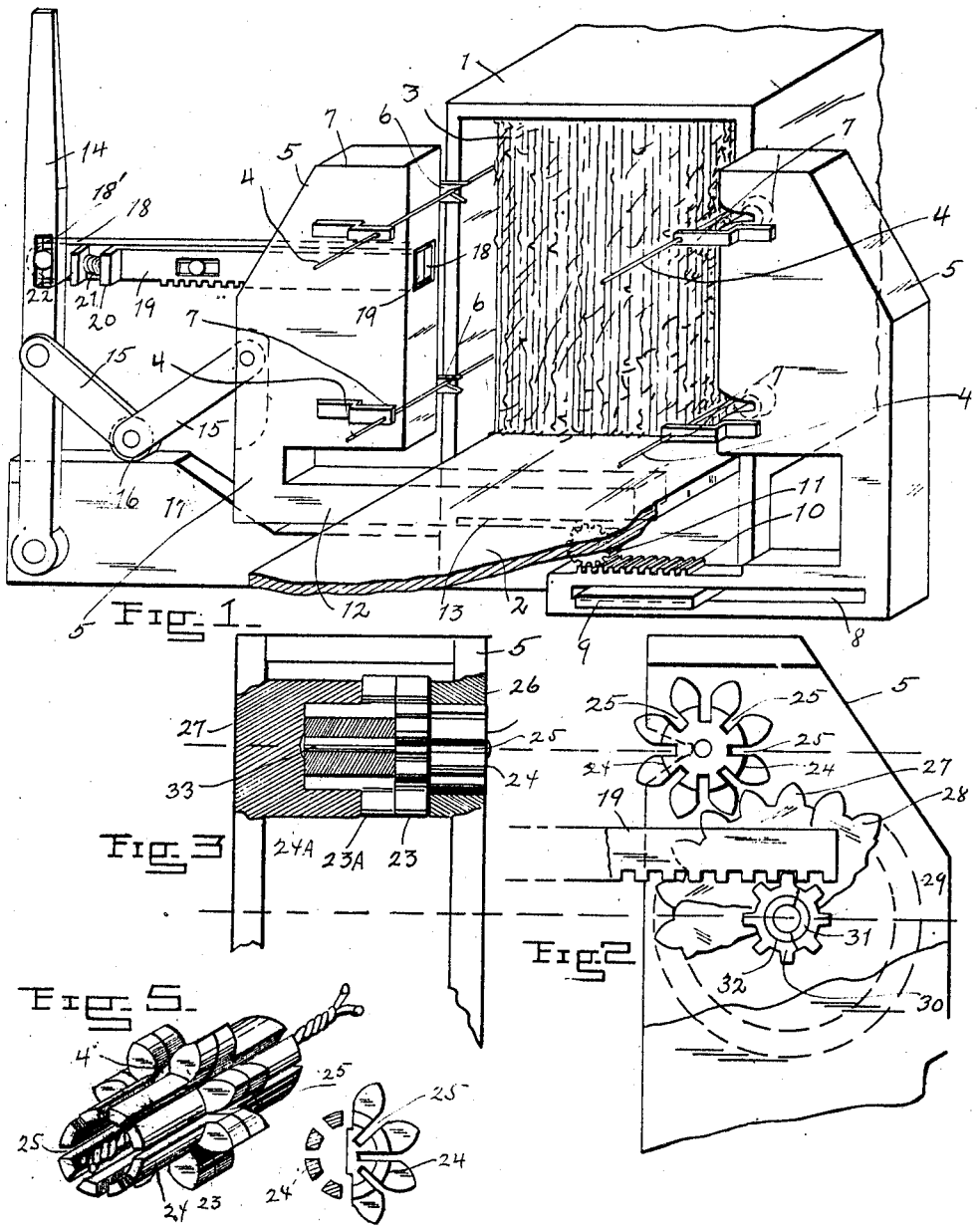

WALTER B. M. BROOKS, OF MONTGOMERY, ALABAMA.

BALING APPARATUS.

1,004,555.    Specification of Letters Patent.    Patented Oct. 3, 1911.

Application filed February 11, 1911. Serial No. 608,052.

*To all whom it may concern:*

Be it known that I, WALTER B. M. BROOKS, a citizen of the United States, and a resident of the city and county of Montgomery, State of Alabama, have invented certain new and useful Improvements in Baling Apparatus, of which this is a specification, reference being had to the drawing forming part hereof.

The invention relates to apparatus for forming bales of hay, alfalfa, and the like, and is applicable to a number of like uses. Its objects are to provide simple, novel and efficient modifications and improvements in the baling press, and to provide a positively acting, novel and inexpensive automatic bale tie fastener and cutter by means of which the automatic baling of material such as specified can be carried on with economy and speed.

In the drawing only so much of a baling press is shown as is necessary to fully illustrate the invention.

In Figure 1 I show a baling press, lacking the forward parts, including the reciprocating pusher usual in this type of apparatus. The view includes the apparatus of my invention, however, (with exceptions to be noted) and represents a press equipped with it less only the parts not needed for full understanding. In Fig. 2 I show the details of the twister and cutter mechanism, and in Figs. 3, and 4 and 5, respectively, two types of the twisting and cutting elements.

In this invention I ordinarily provide two members or arms arranged to enter the press from opposite sides, meeting approximately at the center. These members bring together the baling wires. One of these members carries the twisting and cutting elements and the other, although not necessarily so, carries the means for actuating the said elements. In the operating of the invention the two arms referred to come together, bringing the baling wires; the twisters engage the members of respective pairs of wires, twist them sufficiently, and then the cutting device cuts the joined wires in such manner as to leave them joined upon the bale and joined for the reception of a new bale—the system being easily understood when it is explained that the twisted wires are cut approximately intermediate of the twist (or, actually, between two twists).

In the drawing 1 is the case or body of the press, 2 is its floor, shown partly broken away in front.

3 is the nearer end of a bale, as of hay.

4, 4, 4, 4 are the baling wires, their nearer ends shown broken away. (It will be understood that these baling wires may lead from the reels usual in such machines and generally located somewhat forward of the elements of the press here indicated.)

5, 5 are the two reciprocating members referred to as capable of entering the press. They are guided in some suitable manner, not a part of the invention, as for example, see the slot 8 in the right hand member 5 engaging the plate or guide member 9 below the press. Similar guiding means are provided for the left hand member 5 (not shown, as no points of novelty are involved) and the two members 5, 5 are mutually geared together so that when one is moved in or out the other moves similarly. This I accomplish by forming racks (the one shown in full lines at 10, and the other indicated by a dotted line at 13) on the reciprocating members (or attached thereto) which engage an intermediate gear wheel 11. The arrangement shown has the gear wheel working on a horizontal axis and occupies too much room although more easily illustrated than the preferred arrangement, that with a vertical axis, but the details of the intergearing of the reciprocating members are not essentials. The member 5 to the left is provided with wire-engaging jaws at 6, 6, and each of the members is provided with looped wire guides as at 7, 7, 7, 7,—a guide being provided for each wire employed. As will be seen from the drawing the right hand member 5 is also provided with wire receiving notches just behind each strand of wire.

To operate the reciprocating members I provide a lever 14, pivoted on an arm or extension from the base of the press, and connected by two toggle-members 15, 15, with the left hand block or member 5. A roller, 16, at the junction of the toggle-members 15, 15, runs on a horizontal portion of the extension just referred to and thus prevents the toggle-members from acting otherwise than as would a rigid or one part link. As I require, however, that there shall be further movement of the lever 14, after the two members, 5, 5, meet in the press, I provide an inclined fall, 17, on the extension from the base of the press, the function of which will be obvious. Moving lever 14 causes the member 5 (to the left) to enter the press, the extension 12, of that member through rack 13, actuating gear 11 and rack 10 and drawing in member 5 to the right also. Up to that stage of the movement of the lever 14 where the toggle-joint roller 16 leaves the horizontal part of the extension the blocks or reciprocating members steadily move inward. As soon, however, as the toggle-joint roller reaches the fall, 17, the inward movement ceases, or decreases in speed, dependent entirely upon the inclination of the fall 17. As will be seen I provide for a decrease and a stoppage of movement both. In the figure the relative positions of the wire carrying guides 7, 7, 7, 7 are somewhat misleading. They need not be sufficiently forward of the advancing face of the arms or members 5, 5, to meet when those members meet, but may be a little back, as their function is merely to retain the baling wires.

From the description so far it will be seen that when a bale is completed, except for the bringing together of the baling wires, the inward movement of lever 14 will bring these wires together in the middle of the press, ready for twisting and cutting. (Fig. 1 illustrates the parts just at the stage referred to). It will be seen that in the left hand member 5 is a guide way, not numbered, in which I provide two racks, 18, and 19, working side by side. Of these the rack 18 is pivotally connected or linked to the lever 14, see the slot-and-pin connection at 18′. An extension or shoulder 20, is formed on the nearer rack, 19, and a spring, 21, is held between this shoulder and a similar one, 22, secured to or formed on rack 18. Rack 19 is arranged to slide on rack 18 by suitable guides, or as here shown. The object of the spring engagement between the two racks is to permit rack 19 to stop a short time before rack 18 comes to rest—this being permitted by the spring 21, which is sufficiently stiff, however, to ordinarily cause the two racks to move together. The parts are so co-ordinated that when lever 14 is moved in the members 5, 5, nearly meet before the racks begin to move relatively to the member within which they slide. The racks then emerge from the member and move forward at about the same speed at which the member was moving before, but the members 5, 5, now move slowly, owing to the slipping of the toggle roller down the fall 17. The members 5, 5, then meet in the center of the press and stop, but the racks continue to move up to their full limit, rack 19, however, being stopped first by engagement of its extension or shoulder 20 with the rear of the member within which it slides. Bearing these movements of the parts in mind the operation of the twister and cutter will be easily followed.

In Fig. 2 I show a part of member 5 (to the right) with its inclosing face nearer the observer partly removed. At each of the notches in the front face of the member 5, referred to above, are positioned the twister and cutter elements. (Only one set is here shown.) The twister and cutter consists of two elements, each of like form and size, and presenting an end view such as shown in Fig. 2. Each consists of a small gear wheel provided with an axial extension or integral shaft and also with deep radial slots between its teeth, see 25, 25, 25, Fig. 2, and 25 Fig. 3. These radial slots are not only between the teeth of the gear but extend a distance into the axial extension (see Fig. 3). As shown in Fig. 3 the two twister and cutter elements are positioned with their gears adjacent, the teeth being in register, and are journaled by their axial extensions in suitable bearings in the frame of member 5. See the side elevation and section, to right and left respectively, in Fig. 3, and the sectional journals, 26, 26′. Through an axial hole a rivet or bolt 33 joins the members, but this is not absolutely essential. The slots 25, between the teeth of the twister gears are deep enough to allow entrance of two bale wires at least, although ordinarily I operate the apparatus with only one wire in a slot.

We may now consider the means for actuating the twister and cutter gears. Adapted to be engaged by racks 18, and 19, are two small gears placed side by side, as 29, 30, (one behind the other in the figure and the forward one partly broken away), carried upon respective hollow shafts, 31, 32. Upon each of these shafts is a similar gear of large diameter, one behind the other, see the partly broken gears 27, 28. These larger gears engage the two twister and cutter gears. It will be seen, therefore, that the racks 18, 19, by engaging the two small gears 29, 30, rotate the large gears 27, 28, and thereby the two elements, 23 and 23^A of the twister and cutter.

From the foregoing the operation of the apparatus will be now understood. At the stage when the blocks or members 5, 5, decrease in speed and the racks emerge the bale wires to the right have been engaged in slots of the twister and cutter wheels— the wires to the left not yet being brought near enough. At this stage the racks first engage the small gears 29, 30, and cause a partial rotation of the twister and cutter wheels so that when the wires from the left do reach the twister and cutter wheels they will enter radial slots different from those containing the wires from the right hand side of the press. Then, as the members 5, 5, meet and stop further advance, the forward movement of the racks causes several revolutions of the twister and cutter wheels, producing a twist in the bale wires both before and behind these elements. Finally, as the stop or shoulder on rack 19 comes to engagement with the member in which it is guided that rack, and its related gears, stop, but the other rack 18 still goes forward for a short space, the spring, 21, allowing the movement to take place. Thus, while one of the two twister and cutter elements remains locked the other still moves and the twisted wires are cut or sheared by the gear teeth, the cut taking place between the two twisted portions. Withdrawal of the lever 14 brings the members 5, 5, back to their original positions, but the bale wires leading through the guides 7, 7, etc., remain tied together in pairs, ready for formation of a new bale.

I prefer, ordinarily, not to form the twister and cutter elements as shown in Fig. 3, with solid axial extensions or shafts, but to have these shafts hollow. Such a construction is shown in Fig. 4. Here the view is an end elevation on one side and a sectional view of the hollow shaft or axial extension only on the other. It will be seen that the only difference in structure is the hollowing of the shaft and the absence of the connecting rivet of the other figure.

While, ordinarily, I prefer to employ intermediate gearing between the racks and the twister and cutter gears, principally to obviate too great travel of the racks, yet I may, obviously, dispense with such gearing and actuate the cutter gear directly from the racks—in this case, however, I will obviously have to employ a pair of racks for each pair of twister and cutter elements. I may, also employ the twister and cutter elements in the same member or arm in which the racks are guided, as it is by no means essential that the racks be carried by one member and the twister and cutter elements by another. The same means herein shown for giving the differential shearing movements to the twister gears can be employed in such a case as even as here shown it is clear that the racks could just as well actuate the gears if they were carried by the left hand reciprocating member only. And, since the rotation of the twisters could commence before the right hand wire was reached so that it would enter radial slots not occupied by the left hand wire the wires will be engaged and operated upon precisely as if the right hand wire was first engaged, as is the case in the apparatus as shown in Fig. 1. Obviously, also, while the arrangement of two racks, one of which can slide relatively to the other, is a very efficient and simple means for giving the joint and differential action to the twister and cutter gears, I can operate the gears by other means within the knowledge of those skilled in apparatus of the class. It is scarcely necessary to say that in practice I form the twister and cutter elements of hard material, such as tempered steel, so that the shearing action is positive and wear eliminated as much as may be.

Having described my invention, what I claim is:—

1. In apparatus of the class described, the twister and cutter element composed of a gear wheel provided with relatively deep radial slots between its teeth and with a hollow axial extension having radial openings corresponding in angular position to such slots.

2. In apparatus of the class described, a combined twister and cutter comprising two gear wheels provided with hollow axial sleeves, radial slots extended through said sleeves, and means for rotating said gears together and relatively, substantially as set forth.

3. In apparatus of the class described, a press, members arranged to enter the press from opposite sides thereof, a combined twister and cutter comprising two gear wheels provided with hollow axial sleeves, radial slots extending through said sleeves to the interior thereof and registering with the interval between teeth of the gear, and means related to said entering members for rotating said gears together and relatively, substantially as set forth.

4. In apparatus of the class described, a press, arms arranged to enter the press, a combined twister and cutter carried by one of said arms and comprising two gear wheels having deep spaces between teeth and hollow axial extensions slotted axially in register with the spaces between the gear teeth, and means carried by one of said arms for rotating said gears together and relatively.

5. The combined wire twister and cutter set forth, consisting of two deeply cut gear wheels having a common axis of rotation and closely approximated, said gear wheels having hollow axial extensions provided with axial slots in register with the spaces between gear teeth, bearings for said axial extensions, and means for giving said gear wheels a common and a differential rotary movement.

Witness my hand this 8th day of February, 1911.

WALTER B. M. BROOKS.

Witnesses:
 Thomas J. Scott,
 Troy Hails.